United States Patent
Kikuchi

(10) Patent No.: US 8,222,854 B2
(45) Date of Patent: Jul. 17, 2012

(54) OPTICAL APPARATUS

(75) Inventor: Takayuki Kikuchi, Utsunomiya (JP)

(73) Assignee: Canon kabushiki Kaisha, Tokyo (JP)

( * ) Notice: Subject to any disclaimer, the term of this patent is extended or adjusted under 35 U.S.C. 154(b) by 526 days.

(21) Appl. No.: 12/403,741

(22) Filed: Mar. 13, 2009

(65) Prior Publication Data

US 2009/0230911 A1    Sep. 17, 2009

(30) Foreign Application Priority Data

Mar. 14, 2008    (JP) ................. 2008-066210

(51) Int. Cl.
G05B 19/40    (2006.01)
G05B 11/00    (2006.01)
(52) U.S. Cl. .............. 318/685; 318/696; 318/701
(58) Field of Classification Search ............ 318/685, 318/696, 701
See application file for complete search history.

(56) References Cited

U.S. PATENT DOCUMENTS

2006/0108964 A1*    5/2006    Shibatani .............. 318/685

FOREIGN PATENT DOCUMENTS

| JP | 4-364399 | 12/1992 |
| JP | 8-54553 | 2/1996 |
| JP | 11-110045 | 4/1999 |

* cited by examiner

Primary Examiner — Walter Benson
Assistant Examiner — Erick Glass
(74) Attorney, Agent, or Firm — Canon USA Inc IP Division

(57) ABSTRACT

An optical apparatus ensuring smooth driving control of an optical member is disclosed. The optical apparatus includes an optical member, a stepping motor configured to drive the optical member, a driving commander configured to generate driving pulses supplied to the stepping motor, a pulse count generator configured to count the driving pulses output from the driving commander, a position detector configured to detect a position of the optical member, and a pulse count presetter configured to replace, based on an output of the pulse count presetter and an output of the position detector, a pulse count output from the pulse count presetter with a pulse count corresponding to the output of the position detector.

6 Claims, 7 Drawing Sheets

OPTICAL APPARATUS

BACKGROUND OF THE INVENTION

1. Field of the Invention

The present invention relates to an optical apparatus configured to drive an optical member by using a stepping motor.

2. Description of the Related Art

Recently, an autofocus detector has been used, as an essential component, in an image pickup apparatus, such as a general video camera. Further, precise position control is demanded in driving a focusing mechanism when focus adjustment is performed. A stepping motor is often used as a driving source for driving the focusing mechanism. Because the stepping motor is rotated one-step by one-step in accordance with a driving command of one pulse, driving steps can be predicted at the time when the driving command is issued. In general, the focusing mechanism using the stepping motor, as the driving source, is constructed of a simple open-loop control system in which feedback control is not performed.

However, a position of the focusing mechanism, which is detected by the open loop control, is sometimes deviated from an actual position due to an influence of backlash, such as a reverse hysteresis and a play, which is present in a transmission mechanism for transmitting motive power of the stepping motor to the focusing mechanism. Accordingly, when highly-accurate position control is needed, the feedback control is performed by using an MR (Magnetic Resistance) sensor or the like, as a position sensor in the focusing mechanism, in some cases.

Japanese Patent Laid-Open No. 11-110045 discloses a usage example of combination of the stepping motor and the position sensor. According to Japanese Patent Laid-Open No. 11-110045, the position sensor is attached to a control target and feedback control is performed based on information from the position sensor, thus ensuring highly-accurate control. Further, determination as to loss of synchronism, for example, can be made based on a value of a driving command and a state of the position sensor.

With the above-cited Japanese Patent Laid-Open No. 11-110045, the driving command for the stepping motor is generated depending on the state of the position sensor. Therefore, the stepping motor cannot be stably driven in some cases due to influences of a detection delay time of the position sensor and a noise component superimposed on a signal of the position sensor. The detection delay time depends on not only a period from AD conversion of a signal of the MR sensor to recognition of position information by a microcomputer for control of the stepping motor, but also on a deadband zone of a driving mechanism.

Thus, for example, when a lens is driven such that the position command instructing a target position of the lens and the position information from the position sensor match with each other, the lens is moved in excess of the target position and an operation of compensating for an overshoot is repeatedly generated. Hence, the so-called hunting occurs.

Further, because electric power is supplied as a rectangular-wave pulse to a driver circuit during the driving of the stepping motor, noise is more apt to mix in an analog signal. If noise mixes in the signal and the microcomputer for control of the stepping motor recognizes false position information, an unexpected malfunction may occur.

SUMMARY OF THE INVENTION

An exemplary embodiment of the present invention provides an optical apparatus which has succeeded in overcoming the above-described problems in the art, which can prevent unstable behaviors caused when only the position information from the position sensor is used, and which can realize smooth driving control of an optical member.

According to an aspect of the present invention, the optical apparatus includes an optical member, a stepping motor configured to drive the optical member, a driving commander configured to generate driving pulses supplied to the stepping motor, a pulse count generator configured to count the driving pulses output from the driving commander, a position detector configured to detect a position of the optical member, and a pulse count presetter configured to replace, based on an output of the pulse count presetter and an output of the position detector, a pulse count output from the pulse count presetter with a pulse count corresponding to the output of the position detector.

Further features of the present invention will become apparent from the following description of exemplary embodiments with reference to the attached drawings.

DESCRIPTION OF THE EMBODIMENTS

An optical apparatus according to an exemplary embodiment of the present invention will be described in detail with reference to the drawings.

Figure 1:
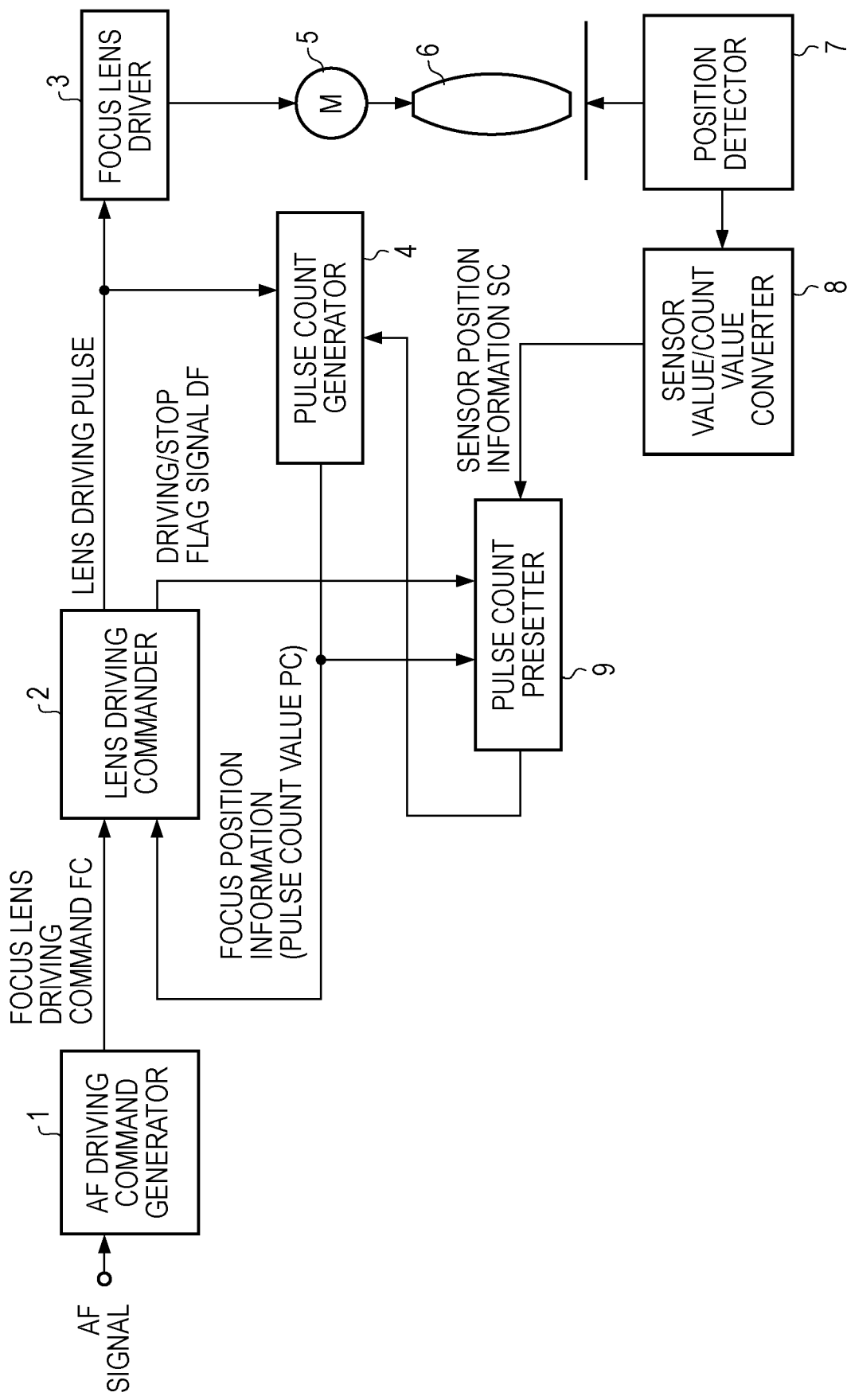
FIG. 1 is a circuit block diagram illustrating a first exemplary embodiment.

FIG. 1 is a circuit block diagram of a focus-lens driving and processing unit of a video camera that is an example of the optical apparatus.

Referring to FIG. 1, reference numeral 1 denotes an AF driving command generator. The AF driving command generator 1 outputs a focus lens driving command FC in accordance with edge information (AF signal) included in a taken image signal.

Reference numeral 2 denotes a lens driving commander. The lens driving commander 2 outputs a lens driving pulse and a driving/stop flag signal DF in accordance with focus lens position information (pulse count value PC), described below, and the focus lens driving command FC from the AF driving command generator 1. The driving/stop flag signal DF is a signal for identifying whether driving of a focus lens is to be output.

Reference numeral 3 denotes a focus lens driver, e.g., a driver circuit, configured to perform the driving of the focus lens in accordance with the lens driving pulse output from the lens driving commander 2.

Reference numeral 4 denotes a pulse count generator. The pulse count generator 4 counts the lens driving pulse output from the lens driving commander 2 and holds the pulse count value PC. Further, the pulse count generator 4 outputs the pulse count value PC, as the focus lens position information, to the lens driving commander 2.

A stepping motor 5 is rotated in accordance with the output of the focus lens driver 3. A focus lens 6 is movable in the direction of an optical axis corresponding to the rotation of the stepping motor 5.

Reference numeral 7 denotes a position detector configured to detect the position of the focus lens 6. The position detector 7 is constituted by, e.g., an MR sensor. Numeral 8 denotes a sensor value/count value converter. The sensor value/count value converter 8 converts the position information provided by an output signal of the position detector 7 to position information in units of pulse for the stepping motor 5 and then outputs the converted position information as sensor position information SC.

Reference numeral 9 denotes a pulse count presetter. When the driving/stop flag signal DF indicates the stop state and the difference between the pulse count value PC and the sensor position information SC is equal to or larger than a predetermined value, the pulse count presetter 9 presets the pulse count value PC output from the pulse count generator 4 such that the sensor position information SC becomes the pulse count value PC.

Figure 2:
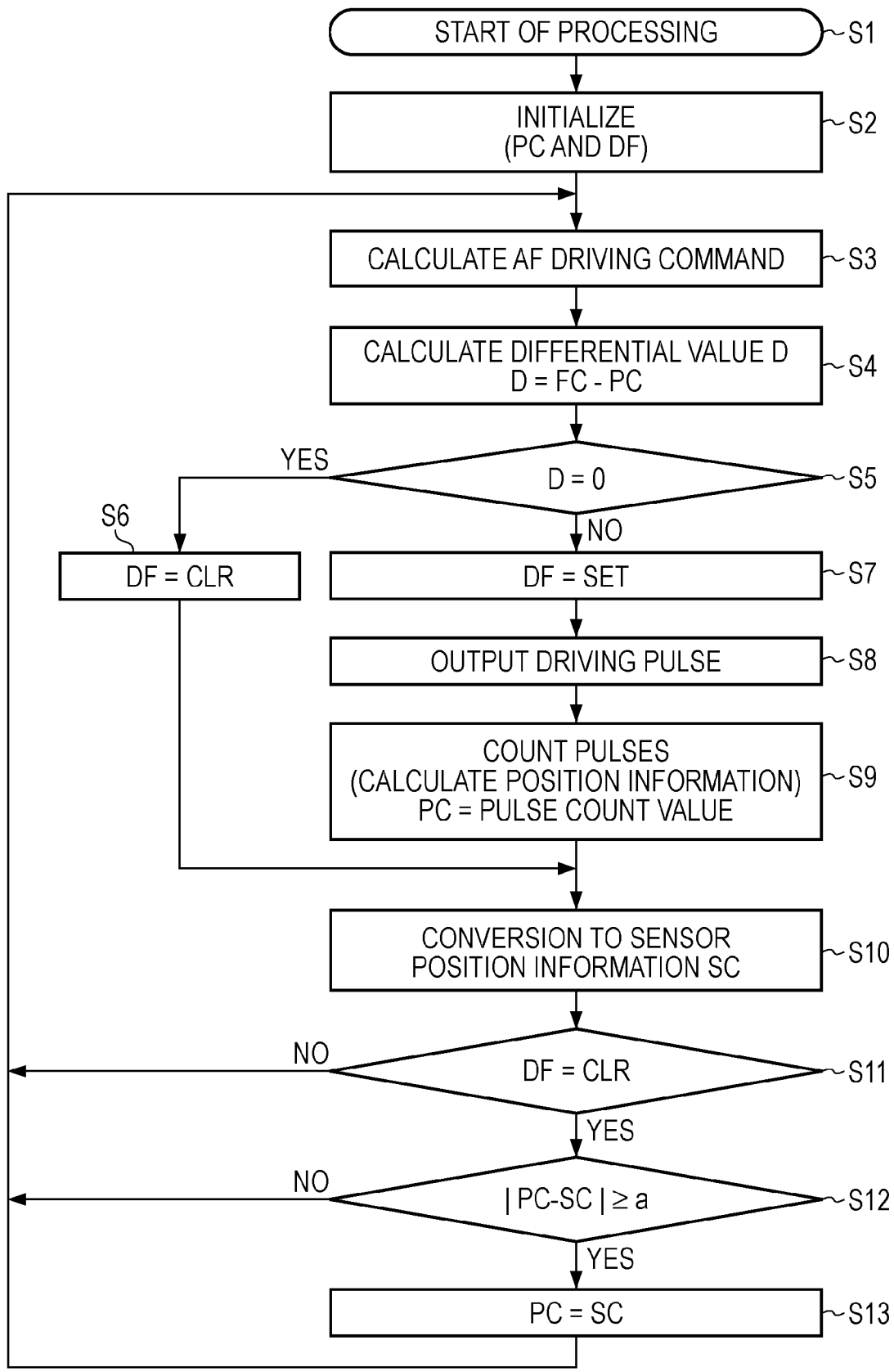
FIG. 2 is an operation flowchart.

FIG. 2 is an operation flowchart. The focus-lens driving and processing unit in this first exemplary embodiment starts processing in step S1. In step S2, the pulse count value PC and the driving/stop flag signal DF are initialized. After the initialization, in step S3, the AF driving command generator 1 receives a value of edge information included in the taken image signal, and calculates (generates) the focus lens driving command FC for moving the focus (focus lens) such that the value of edge information is maximized. The calculated focus lens driving command FC is output to the lens driving commander 2.

In step S4, the lens driving commander 2 calculates (generates) a differential value D between the focus lens driving command FC and the pulse count value PC that provides the position information of the focus lens 6 as described later.

If the differential value D is zero in step S5, i.e., if the focus lens 6 is at a position as per commanded (YES in step S5), the lens driving commander 2 sets the driving/stop flag signal DF to a low level (DF=CLR) indicating a stop state in step S6, thus stopping the generation of the lens driving pulse.

On the other hand, if the differential value D is not zero in step S5 (NO in step S5), the lens driving commander 2 sets the driving/stop flag signal DF to a high level (DF=SET) in step S7, and then outputs, in step S8, the lens driving pulse in number that has been calculated depending on the driving direction, the driving speed, and the target position.

In step S9, the pulse count generator 4 calculates, based on the generated lens driving pulses, the pulse count value PC corresponding to the focus lens position information. The pulse count value PC represents the focus lens position information that is obtained with open-loop position calculation based on the focus lens driving command FC.

In step S10, the position detector 7 measures the position of the focus lens 6 in a non-contact manner to detect position information, and then outputs the detected position information to the sensor value/count value converter 8. The sensor value/count value converter 8 converts the position information detected by the position detector 7 to the sensor position information SC, i.e., position information in units of distance through which the focus lens 6 is moved by each driving pulse. The sensor position information SC is used as the position information based on the actual position of the focus lens 6 and is input to the pulse count presetter 9.

In step S11, the pulse count presetter 9 determines whether the driving/stop flag signal DF is at the low level. If the driving/stop flag signal DF is at the low level (DF=CLR) and the stepping motor 5 is stopped (YES in step S11), the processing advances to step S12. If the stepping motor 5 is not stopped (NO in step S11), the processing returns to step S3. If the stepping motor 5 is stopped, the pulse count presetter 9 determines in step S12 whether the difference between the pulse count value PC and the sensor position information SC is equal to or larger than a predetermined value a. IF the difference between the pulse count value PC and the sensor position information is smaller than the predetermined value a (NO in step S12), the processing returns to step S3. On the other hand, if the difference between the pulse count value PC and the sensor position information SC is equal to or larger than the predetermined value a (YES in step S12), the pulse count presetter 9 calibrates, in step S13, the pulse count value PC to a value corresponding to the measured position that is represented by the sensor position information SC. In other words, if there is a difference between the estimated position of the focus lens 6 obtained with the open-loop position calculation and the actual position of the focus lens 6 obtained with the position detector 7, the pulse count presetter 9 replaces the pulse count value PC with the sensor position information SC, i.e., presets the pulse count value PC based on the sensor position information SC, thus calibrating the pulse count value PC.

Figure 3:
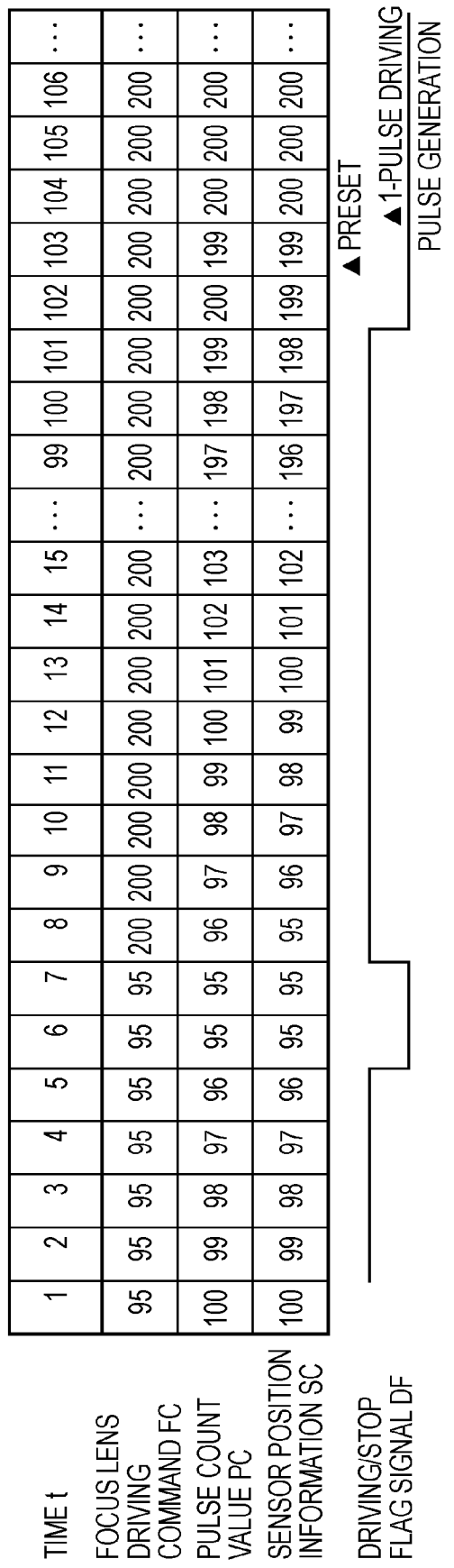
FIG. 3 is a chart illustrating a preset operation.

FIG. 3 is a chart illustrating a preset operation. More specifically, FIG. 3 illustrates the relationships among the focus lens driving command FC, the pulse count value PC, the sensor position information SC, and the driving/stop flag signal DF during a period from a time t1 to a time t106. At the time t1, the lens driving commander 2 is in a state receiving both the focus lens driving command FC indicating movement to a pulse count position "95" and the pulse count value PC of "100" as the focus lens position information. The lens driving commander 2 calculates the differential value D between the pulse count value PC, i.e., the current position information of the focus lens 6, and the focus lens driving command FC, and determines a moving direction and a movement target position of the focus lens 6 so that the differential value D becomes zero. A moving speed of the focus lens 6 is set to a maximum speed obtainable with the position command.

In accordance with the above-described settings, the lens driving commander 2 generates a lens driving pulse in each of A-phase and B-phase. In the state at the time t1, more specifically, the lens driving commander 2 generates the lens driving pulse causing the focus lens 6 to move in a direction in which the differential value D decreases. In response to the lens driving pulse, the focus lens 6 is moved through the focus lens driver 3 and the stepping motor 5, and the pulse count generator 4 counts the lens driving pulse.

Further, the driving/stop flag signal DF is changed to the high level indicating a driving state. Upon the generation of the lens driving pulse, the pulse count value PC and the sensor position information SC are each changed to a value "99" at the time t2. Thereafter, the lens driving pulse is successively generated and the focus lens 6 is guided to the pulse count position "95" at the time t6. The pulse count value PC and the sensor position information SC, each representing such a movement of the focus lens 6, are also each changed to a value "95" correspondingly.

At that time, because the differential value D between the focus lens driving command FC and the pulse count value PC is zero, the lens driving commander 2 stops the generation of the lens driving pulse and the driving/stop flag signal DF is turned to the low level indicating the stop state.

During a period of the stop state from the time t6 to t7, the pulse count presetter 9 compares the pulse count value PC and the sensor position information SC to check the difference therebetween. Because the differential value D at that time is zero, i.e., because the differential value D is smaller than the preset determination value (smaller than 1 in this first exemplary embodiment), the preset operation is not performed.

At the time t8, a new target position "200" of the focus lens driving command FC is input. In a similar manner to that described above, the lens driving commander 2 generates the lens driving pulse so that the differential value D between the focusing command value (focus lens driving command FC) and the focus lens position (pulse count value PC) becomes zero. While the pulse count value PC is changed from "95" to "96" at the time t8, the sensor position information SC is not changed from "95" at the time t8 due to an influence of backlash and is changed from "95" to "96" at the time t9.

Such a deviation between the pulse count value PC and the sensor position information SC is constantly maintained during the subsequent driving. At the time t102, the pulse count value PC and the focus lens driving command FC match with each other. Therefore, the generation of the lens driving pulse in the lens driving commander 2 is stopped and the driving/stop flag signal DF is turned to the low level indicating the stop state. During a period of the stop state corresponding to the time t102, the pulse count presetter 9 compares the pulse count value PC and the sensor position information SC to check the difference therebetween. Because the differential value D at that time is "1", i.e., because the differential value D is larger than the preset determination value smaller than "1", the preset operation is performed.

In the preset operation, the sensor position information SC is assigned to the pulse count value PC at the time t103. Upon such a change of the pulse count value PC, the lens driving commander 2 detects the differential value D between the focus lens driving command FC of "200" and the pulse count value PC of "199". At the time t104, as a position sensor in the focusing mechanism generates the lens driving pulse again to perform control such that the focus lens position information, i.e., the pulse count value PC, and the focus lens driving command FC match with each other. A driving speed in the control performed at the time t104 for making the pulse count value PC and the focus lens driving command FC matched with other is set to such a low speed as not causing hunting.

For example, when the differential value D between the focus lens driving command FC and the pulse count value PC is "5", i.e., when the driving control corresponding to 5 pulses is executed, 1-pulse driving is performed 5 times in units of settlement period of the focus lens 6. By executing the driving control in such a manner, the sensor position information SC can be generated without undergoing an influence of vibration that is produced with the stepping operation by the lens driving pulse (focusing pulse). Therefore, the preset operation is prevented from being erroneously performed. Alternatively, the driving control can also be executed at a cycle exceeding the lens settlement period or by using plural pulses per cycle.

With the above-described processing, a positional deviation caused by backlash, etc. can be reduced without deteriorating response, while hunting is suppressed which is otherwise caused around the driving target position due to the delay time of the position detector 7. Further, even if the posture of the focus lens 6 is changed and a lens mechanism is retracted, the change of the lens posture can be compensated for through the processing executed in this first exemplary embodiment. In addition, since the sensor position information SC is used only when the driving is stopped, the influence of noise caused by the lens driving pulse is suppressed.

In the above description, the replacement of the pulse count value PC with the sensor position information SC is performed on condition that the driving/stop flag signal DF is at the low level indicating the stop state of the stepping motor 5. However, the determination as to the stop state of the stepping motor 5 can also be performed with respect to the sensor position information SC that is the actual position information of the focus lens 6, and a result of that determination can be added to the condition for replacing the pulse count value PC with the sensor position information SC. In the latter case, the driving control can be executed without using the driving/stop flag signal DF.

Figure 4:
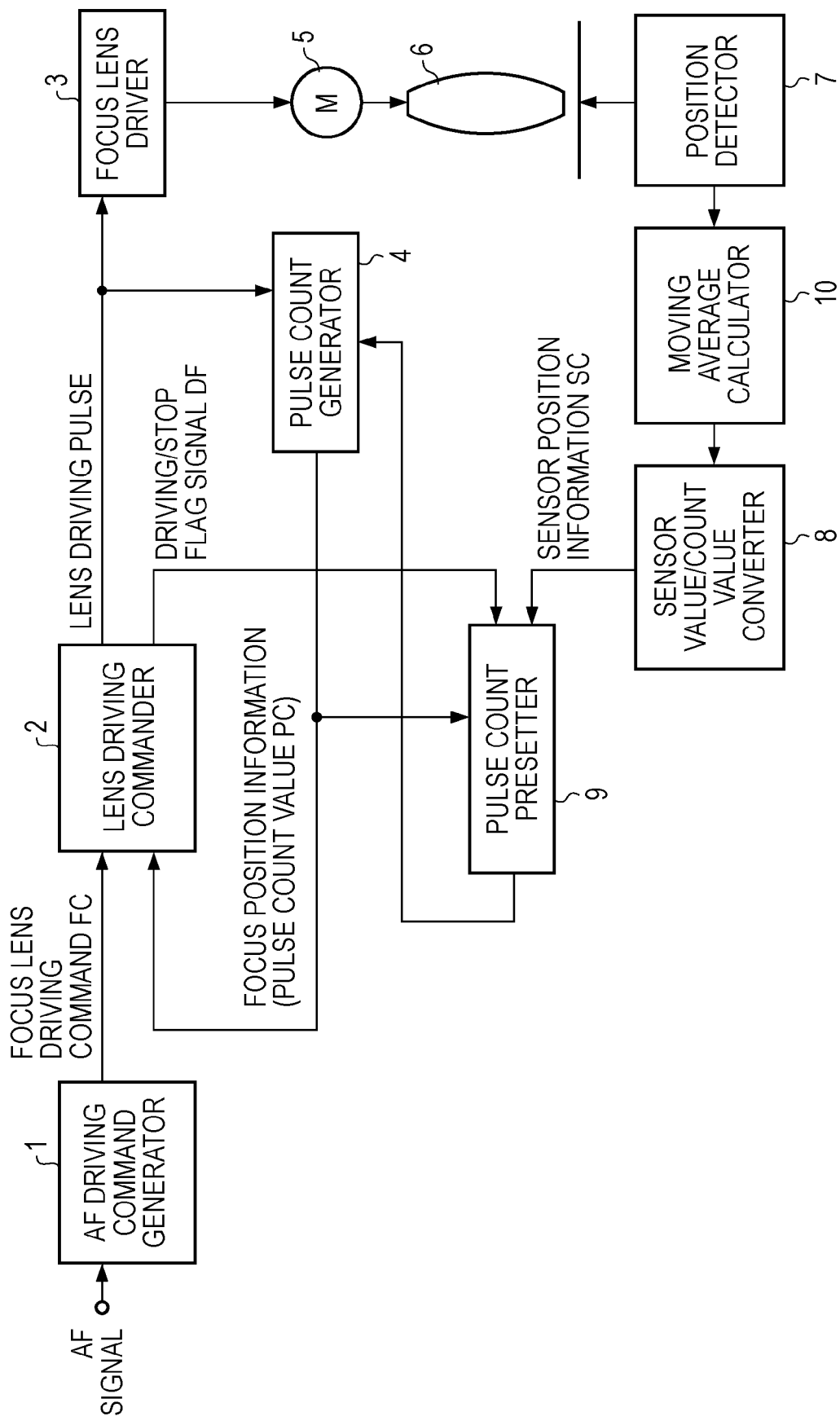
FIG. 4 is a circuit block diagram illustrating a second exemplary embodiment.

FIG. 4 is a circuit block diagram illustrating a second exemplary embodiment. In the second exemplary embodiment, a moving average calculator (a moving average generator) 10 for calculating (generating) a moving average (a moving average value) is additionally connected to the output of the position detector 7 in the first exemplary embodiment such that an average value of the sensor signal is input to the sensor value/count value converter 8. Herein, the moving average can be an average value of a signal obtained based on the output of the position detector 7. Of course, such a signal can be provided as an average amount of movements of the optical member, or an average number of pulses sent to the motor for driving the optical member.

When the position detector 7 is constituted by an MR sensor, for example, an analog signal is detected by the position detector 7, thus causing a risk that the analog signal is affected by noise attributable to the lens driving pulse for the stepping motor 5 and the sensor position information SC is generated as an unexpected value. Such an influence of the noise can be reduced by averaging the sensor signal by the moving average calculator 10. When the process of calculating the moving average is performed, the delay time is prolonged, thus making the hunting operation more apt to occur. However, since the processing in the second exemplary embodiment is executed in a limited period during which the focus lens driving command FC is ceased, the hunting operation is hardly generated.

Figure 5:
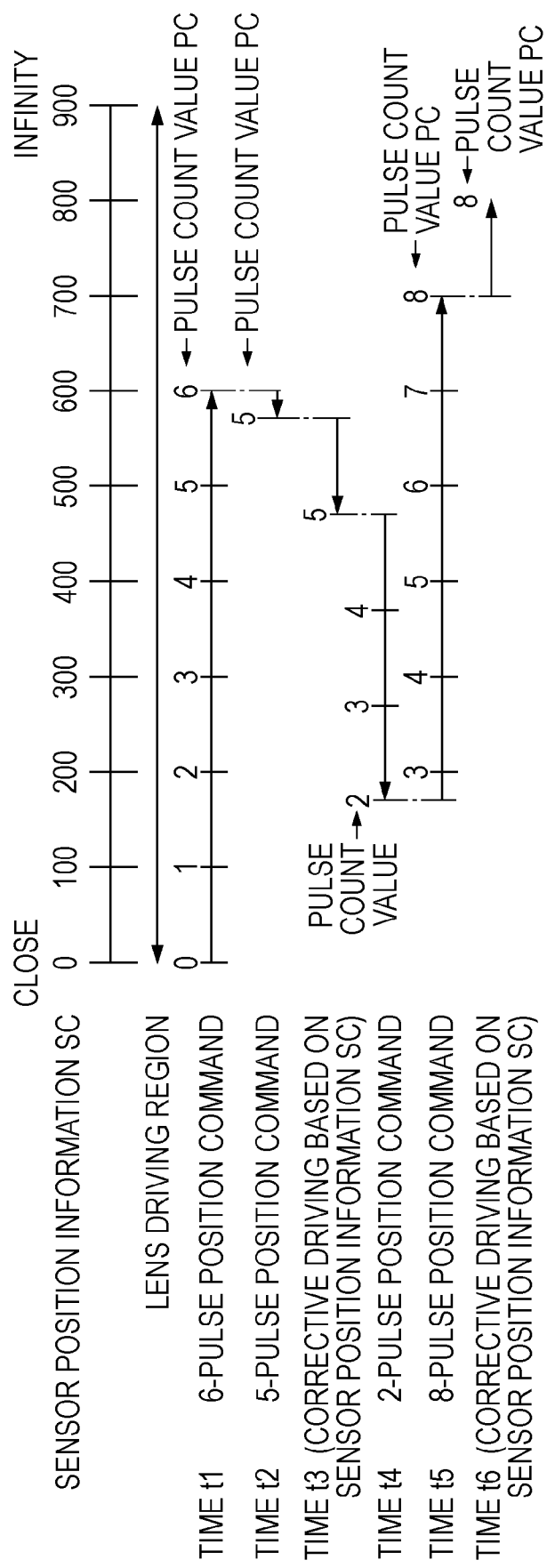
FIG. 5 is a chart illustrating the operations performed in the first and second exemplary embodiments.

When the driving direction is reversed, backlash may occur due to a mechanical cause. FIG. 5 is a chart illustrating the operations performed in the first and second exemplary embodiments. More specifically, FIG. 5 represents the relationship between the sensor position information SC provided as the output of the position detector 7 and the pulse count value PC provided as the output of the pulse count generator 4 when predetermined commands are input in time series order.

Further, for easier understanding, it is assumed that the driving distance by one pulse upon the occurrence of backlash is "20" in terms of sensor value, and the driving distance by one pulse in forward driving is "100" in terms of sensor value. In the first and second exemplary embodiments, the influence of backlash is offset at times t3 and t6 in FIG. 5 by performing corrective driving with presetting of the sensor position information after the completion of each reverse driving.

Figure 6:
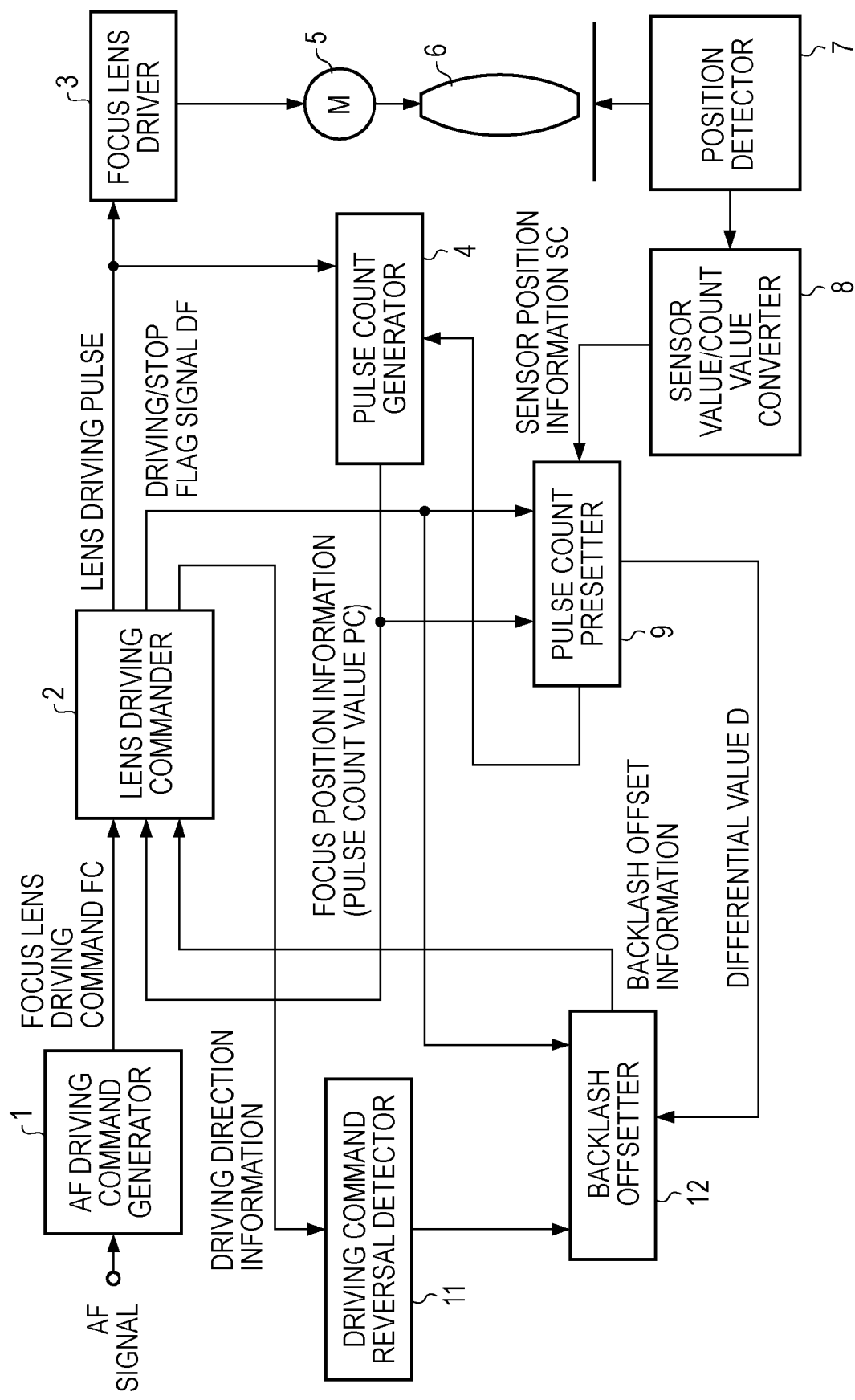
FIG. 6 is a circuit block diagram of an image pickup apparatus according to a third exemplary embodiment.

FIG. 6 is a circuit block diagram of an image pickup apparatus according to a third exemplary embodiment. In the third exemplary embodiment, backlash is calculated in addition to the configuration of the first exemplary embodiment, and a calculated result is reflected on the lens driving pulse. This third exemplary embodiment differs from the first exemplary embodiment, illustrated in FIG. 1, in that a driving command reversal detector 11 and a backlash offsetter 12 are additionally disposed.

The driving command reversal detector 11 detects reversal of the lens driving direction by comparing the previous driving direction and the current driving direction based on driving direction information that is output from the lens driving commander 2. The backlash offsetter 12 generates backlash offset information based on a reversal detection signal provided as an output of the driving command reversal detector 11, the driving/stop flag signal DF provided as the output of the lens driving commander 2, and the differential value D provided as the output of the pulse count presetter 9, and then outputs the backlash offset information to the lens driving commander 2.

Figure 7:
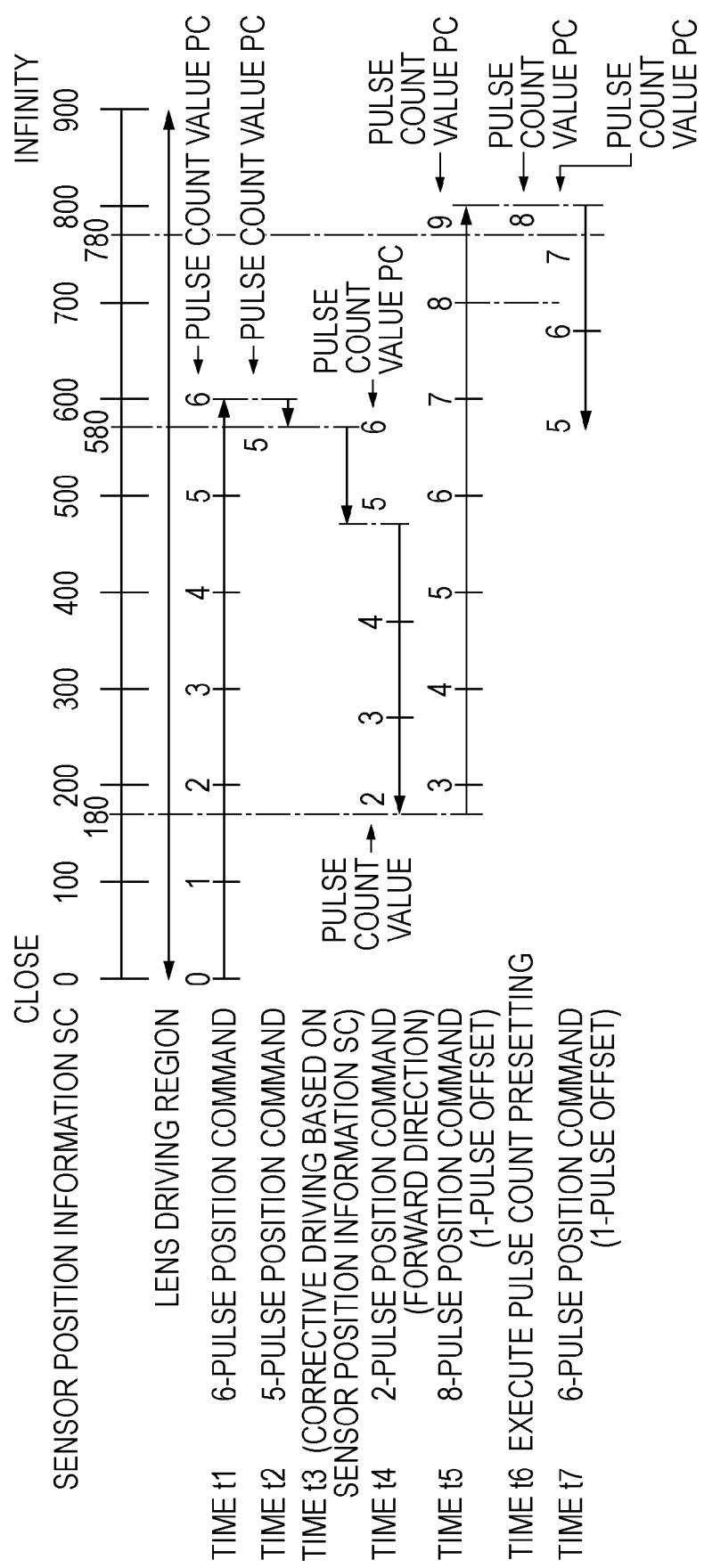
FIG. 7 is a chart illustrating the operation of the image pickup apparatus according to the third exemplary embodiment.

FIG. 7 is a chart illustrating the operation of the image pickup apparatus according to the third exemplary embodiment. At a time t1 in FIG. 7, the position command indicating movement to a 6-pulse count position is input to the stepping motor 5, whereupon the stepping motor 5 drives the focus lens 6 to the 6-pulse count position, i.e., a position corresponding to the sensor position information SC of "600".

It is now assumed that a 5-pulse count position command is input to the stepping motor 5 at a time 2. Because the previous 6-pulse count position command represents driving toward infinity and the current 5-pulse count position command represents driving toward a close range, the driving command reversal detector 11 determines that reverse driving has occurred, and outputs the reversal detection signal to the backlash offsetter 12. Then, the focus lens 6 is moved in accordance with the focus lens driving command FC. Due to the influence of reverse backlash, however, the driving of the focus lens 6 is stopped at a position of "580" in terms of the sensor position information SC in spite of that the focus lens 6 is to be moved to a position of "500" in terms of the sensor position information SC.

The backlash offsetter 12 receives the reversal detection signal provided as the output of the driving command reversal detector 11 and the driving/stop flag signal DF provided as the output of the lens driving commander 2. The backlash offsetter 12 executes a process of calculating a backlash amount when the reverse driving has occurred and, at the same time, when the condition indicating the stop state is satisfied. To that end, at a time t2, the pulse count presetter 9 generates the differential value D between the position of "500" in terms of the sensor position information SC, i.e., the position at which the focus lens 6 is to arrive, and the actual stop position of "580", and outputs the generated differential value D to the backlash offsetter 12.

The backlash offsetter 12 determines that an inoperative distance attributable to the backlash has occurred as the distance of "80" in terms of the sensor position information SC, and compares the inoperative distance with a threshold of "50" that is 50% of the distance of "100" through which the focus lens 6 is moved by the forward driving. If the inoperative distance is larger than the threshold, the backlash offset information is held such that the driving distance is increased by an amount corresponding to the 1-pulse count position with respect to the next focus lens driving command FC.

While the differential value D is calculated here at resolution of the sensor position information SC obtained by the position detector 7, the differential value D can also be calculated at resolution of the pulse count value PC provided as the output of the pulse count generator 4. In the latter case, however, the calculation is executed at lower resolution.

When the reverse driving occurs for the first time after power-on, a focus-lens correction driving operation is generated based on the sensor position information SC as described above in the first and second exemplary embodiments with respect to the time t3 in FIG. 5. More specifically, the 5-pulse count position is indicated at a time t2 when the driving is completed. However, the actual position to be represented by the sensor position information SC is "580" and the sensor value/count value converter 8 outputs the sensor position information SC of "6". At the start point of the next driving corresponding to a time 3, therefore, the pulse count value PC is changed from "5" to "6" by the pulse count presetter 9. Accordingly, the lens driving commander 2 detects the differential value D between the focus lens driving command FC and the pulse count value PC and outputs the lens driving pulse for corrective driving to the focus lens driver 3. As a result, the focus lens 6 is guided to a new 5-pulse count position.

It is now assumed that the driving command indicating movement to a 2-pulse count position is input at a time t4. Because the previous driving direction is the direction of the corrective driving at the time t3, i.e., the direction toward the close range, and the current driving command indicates movement from the 5-pulse count position to the 2-pulse count position in the direction toward the close range, the driving command reversal detector 11 determines that driving in the forward direction is indicated. Accordingly, the reversal detection signal is not output to the backlash offsetter 12. Thus, the lens driving commander 2 generates (calculates or obtains) the lens driving pulses based on the focus lens driving command FC and the pulse count value PC without using the backlash offset information generated at the time t2. The focus lens 6 is guided to the 2-pulse count position by the generated lens driving pulses.

Assuming now that the driving command indicating movement to an 8-pulse count position is input at a time t5, the driving command reversal detector 11 outputs, to the backlash offsetter 12, the reversal detection signal obtained by comparatively determining the previous driving direction toward the close range and the driving direction toward the infinity indicated by the current driving command. The backlash offsetter 12 outputs, to the lens driving commander 2, the backlash offset information that has been calculated and held at the time t2. The lens driving commander 2 adds or subtracts the backlash offset information output from the backlash offsetter 12, i.e., one pulse in this exemplary embodiment, to or from the lens driving pulses generated in the normal manner, and then outputs the lens driving pulses after the addition or the subtraction to the focus lens driver 3.

The addition or the subtraction is performed so as to indicate a position away from the current position by a distance corresponding to a value of the offset information. In this exemplary embodiment, the lens driving pulses are generated such that the focus lens 6 is guided to a position resulting from adding "1" to the 8-pulse count position as the command position, i.e., a 9-pulse count position. Thus, the focus lens 6 is guided to the 9-pulse count position by those lens driving pulses. Here, a value of the focus-lens position detection information representing the actual position is "800". Accordingly, the preset operation is performed in the pulse count presetter 9 and the pulse count value PC is changed from "9" to "8" at a time t6.

Because the changed pulse count value PC is the same value as the 8-pulse count position command that is the position command provided at the time t5, the corrective driving performed at the time t3 is not generated here. Thereafter, the backlash offsetter 12 calculates the offset amount. At this time, the difference between the position of "800" represented by the sensor position information SC and the actual stop position of "800" corresponds to 0 pulse, and hence the processing is brought to an end without updating the backlash offset information. Note that the backlash offset information is updated when the backlash offset information has a value corresponding to one pulse or more.

Assuming now that a 6-pulse count position command is input at a time t7, the driving command reversal detector 11 outputs, to the backlash offsetter 12, the reversal detection signal obtained by comparatively determining the previous driving direction toward the infinity and the driving direction toward the close range indicated by the current driving command. The backlash offsetter 12 outputs, to the lens driving commander 2, the backlash offset information that has been calculated and held at the time t2.

The lens driving commander 2 adds or subtracts the backlash offset information output from the backlash offsetter 12, i.e., one pulse in this exemplary embodiment, to or from the lens driving pulses generated in the normal manner, and then outputs the lens driving pulses after the addition or the subtraction to the focus lens driver 3. In this exemplary embodiment, the lens driving pulses are generated such that the focus lens 6 is guided to a position resulting from subtracting "1" from the 6-pulse count position as the command position, i.e., a 5-pulse count position. Subsequent processing is executed similarly to that executed at the times t5 and t6. As a result, the backlash correction operation can be performed at a higher speed than that in the first exemplary embodiment.

In the above-described exemplary embodiment, the backlash offset information output is updated in the lens operating state. By operating the focus lens 6 in accordance with a dummy command at the time of lens initialization after power-on and measuring the backlash, however, the offset operation can also be performed without calculating the backlash during the ordinary operation. As an alternative, the backlash offset information obtained with the above-described operation in accordance with the dummy command can be recorded in a nonvolatile memory to eliminate the necessity of performing the measurement whenever the power is turned on.

While the exemplary embodiments have been described in connection with the driving of the focus lens, the present invention is also applicable to driving of other optical members, e.g., a zoom lens and an iris, than the focus lens. Further, while the exemplary embodiments have been described from the viewpoint of hardware with reference to the circuit block diagrams, the processing executed in the exemplary embodiments can also be realized by using software that is installed in a built-in microcomputer for lens control.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-066210 filed Mar. 14, 2008, which is hereby incorporated by reference herein in its entirety.

What is claimed is:

1. An optical apparatus comprising:
   an optical member;
   a stepping motor configured to drive the optical member;
   a driving commander configured to generate driving pulses supplied to the stepping motor;
   a driving command generator configured to output a driving command to the driving commander;
   a pulse count generator configured to count the driving pulses output from the driving commander, the pulse count generator outputting a pulse count to the driving commander;
   a position detector configured to detect a position of the optical member; and
   a pulse count presetter configured to replace, after a predetermined relationship is established between the driving command and the pulse count, based on an output of the pulse count generator and an output of the position detector, the pulse count output from the pulse count generator to the driving commander with a pulse count corresponding to the output of the position detector,
   wherein the driving commander generates the driving pulses based on the pulse count of the driving pulses counted by the pulse count generator and the driving pulses until the predetermined relationship is established between the driving command and the pulse count, and generates the driving pulses based on the pulse count corresponding to the output of the position detector with which the pulse count output from the pulse count generator is replaced by the pulse count presetter and the driving pulses when the predetermined relationship is established between the driving command and the pulse count.

2. The optical apparatus according to claim 1, wherein the pulse count presetter executes the replacement of the pulse count in a stop state of the stepping motor.

3. The optical apparatus according to claim 1, further comprising:
   a moving average generator configured to obtain a moving average of the optical member,
   wherein the pulse count presetter replaces, based on an output of the moving average generator, the pulse count output from the pulse count presetter with the pulse count corresponding to the output of the position detector.

4. The optical apparatus according to claim 1, further comprising:
   a backlash offsetter configured to output backlash correction information regarding the stepping motor to the driving commander,
   wherein the driving commander generates, based on the backlash correction information, the driving pulses supplied to the stepping motor.

5. The optical apparatus according to claim 1, wherein the pulse count presetter replaces the pulse count in a case where a difference between the output of the pulse count generator and the output of the position detector is equal to or larger than a predetermined value.

6. A control method for an optical member driven by a stepping motor, the method comprising:
   generating driving pulses supplied to the stepping motor in response to a driving command;
   counting the driving pulses supplied to the stepping motor;
   detecting a position of the optical member;
   driving the stepping motor until a predetermined relationship is established between the driving command and the counted driving pulses, and stopping the stepping motor when the predetermined relationship is established between the driving command and the counted driving pulses; and
   replacing, based on the counted driving pulses and the detected position of the optical member, the counted driving pulses with a pulse count corresponding to the detected position of the optical member in a state of the stepping motor being stopped.

* * * * *